United States Patent [19]
Ries

[11] Patent Number: 6,038,127
[45] Date of Patent: Mar. 14, 2000

[54] KEYPAD ASSEMBLY USING A LEAD SCREW ASSEMBLY FOR MOVING A CURVED MEMBER

[75] Inventor: Brian T. Ries, Huntington Beach, Calif.

[73] Assignee: Comarco Wireless Technologies, Inc., Irvine, Calif.

[21] Appl. No.: 09/032,296

[22] Filed: Feb. 27, 1998

[51] Int. Cl.[7] .................................................... B41J 11/56
[52] U.S. Cl. .......................... 361/680; 361/680; 361/727;
200/5 A; 379/58; 248/424; 74/89.15; 312/312
[58] Field of Search ..................................... 361/680, 679,
361/681, 683, 684, 685, 686, 608, 610,
725, 727, 825, 741, 756, 802, 829; 200/5 A,
512, 517; 379/52, 58, 433, 428, 368; 400/682;
248/424, 393; 74/89.15; 312/312; 384/42,
24

[56] References Cited

U.S. PATENT DOCUMENTS

| | | | |
|---|---|---|---|
| Re. 32,977 | 7/1989 | Gotoh et al. ............................. | 200/5 A |
| 4,709,972 | 12/1987 | Labudde et al. ........................ | 312/208 |
| 5,262,762 | 11/1993 | Westover et al. ...................... | 345/168 |
| 5,339,213 | 8/1994 | O'Callaghan ........................... | 361/683 |
| 5,490,037 | 2/1996 | Clancy .................................... | 361/680 |
| 5,519,570 | 5/1996 | Chaung ................................... | 361/680 |
| 5,539,615 | 7/1996 | Sellers .................................... | 361/680 |
| 5,612,927 | 3/1997 | Morrison et al. ....................... | 361/685 |
| 5,673,169 | 9/1997 | Wicks ..................................... | 361/680 |
| 5,701,338 | 12/1997 | Leyen et al. ............................ | 379/58 |
| 5,735,619 | 4/1998 | Myint ..................................... | 400/488 |
| 5,754,395 | 5/1998 | Hsu et al. ............................... | 361/680 |
| 5,818,360 | 10/1998 | Chu et al. ............................... | 341/22 |
| 5,885,017 | 3/1999 | Hultzman et al. ...................... | 400/682 |

*Primary Examiner*—Benjamin R. Fuller
*Assistant Examiner*—Jagdish Patel
*Attorney, Agent, or Firm*—Pillsbury Madison & Sutro LLP

[57] ABSTRACT

An apparatus for moving a member between a retracted position and an extended position includes a housing, a movement mechanism, a linear lead screw, a first carriage, and a second carriage. The housing has a curved path between the retracted position and the extended position. The lead screw has a longitudinal axis and threads. The movement mechanism is coupled to the lead screw to rotate the lead screw about the longitudinal axis. The first carriage has a connecting structure and a bore with threads that mate with the threads of the lead screw to move the carriage linearly along the longitudinal axis of the lead screw when the lead screw rotates. The second carriage is coupled to the member and has a connecting structure. The connecting structure of the second carriage operatively couples with the connecting structure of the first carriage to permit lateral and rotational displacement such that the member is moved through the curved path between the retracted position and the extended position as the first carriage moves linearly along the longitudinal axis of the lead screw.

13 Claims, 13 Drawing Sheets

KEYPAD ASSEMBLY USING A LEAD SCREW ASSEMBLY FOR MOVING A CURVED MEMBER

FIELD OF THE INVENTION

This invention relates to keypad assemblies and lead screws, and, in particular embodiments, to a keypad assembly using a lead screw assembly to extend and retract a curved TDD keypad for an emergency call box.

BACKGROUND OF THE INVENTION

Traditionally, a user can utilize an emergency call box to communicate with an emergency dispatch operator using voice communication. Generally, emergency call boxes have not been provided with Telecommunications Devices for the Deaf (TDD) or Text Telephony (TTY) capability. Thus, a user who is deaf, hearing-impaired, or speech-impaired may not be able to communicate with an emergency dispatch operator. The difficulties experienced by a hearing-impaired user are also aggravated by the fact that many emergency call boxes are located in extremely noisy roadside environments.

To overcome these drawbacks, emergency call boxes with TDD or TTY capability have been developed. Call boxes have been equipped with a TDD keypad that is permanently attached on the outside of the call box to enable a user to bidirectionally communicate with an emergency dispatch operator without the need for voice communication. However, these keypads are vulnerable to damage due to harsh environments. In addition, vandalism of these keypads poses a major problem.

To overcome these drawbacks, emergency call boxes with a keypad contained within the call box or with a retractable keypad assembly attached outside of the call box have been developed. However, these keypads are flat and located in a non-ergonomic position, thus hindering use by persons of various heights and in wheelchairs.

Traditionally, lead screws have been used to extend and retract flat trays or other members in a linear direction parallel to the axis of the lead screw. However, flat trays, even if not deployed horizontal to the ground, are not ergonomically adapted for a person's use. Therefore, traditional lead screws are unable to deploy an ergonomic tray to an ergonomic position in order to accommodate use by persons of various heights and in wheelchairs.

SUMMARY OF THE DISCLOSURE

It is an object of an embodiment of the present invention to provide an improved keypad assembly and an improved lead screw assembly, which obviate for practical purposes, the above mentioned limitations.

According to an embodiment of the present invention, an apparatus for moving a member between a retracted position and an extended position includes a housing, a movement mechanism, a linear lead screw, a first carriage, and a second carriage. The housing has a curved path between the retracted position and the extended position. The lead screw has a longitudinal axis and threads. The movement mechanism is coupled to the lead screw to rotate the lead screw about the longitudinal axis. The first carriage has a connecting structure and a bore with threads that mate with the threads of the lead screw to move the carriage linearly along the longitudinal axis of the lead screw when the lead screw rotates. The second carriage is coupled to the member and has a connecting structure. The connecting structure of the second carriage operatively couples with the connecting structure of the first carriage to permit lateral and rotational displacement such that the member is moved through the curved path between the retracted position and the extended position as the first carriage moves linearly along the longitudinal axis of the lead screw.

In particular embodiments of the present invention, the apparatus for moving the member between the retracted position and the extended position further includes a set of tracks engaging the member. The member glides along the set of tracks as the member is moved between the retracted position and the extended position. Other embodiments of the present invention include a plurality of position sensors coupled to the housing for determining when the member is in the retracted position and when the member is in the extended position.

In further embodiments, the member includes a curved keypad that is a membrane-type and a curved keypad plate that is coupled to the curved keypad. The curved keypad plate and the curved keypad curve downward to an ergonomic position when the curved keypad plate and the curved keypad are in the extended position. In additional embodiments, the movement mechanism includes a motor and a pulley coupled to the motor to provide rotary motion.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

FIGS. 2a–2c are partial cross-sectional views of the keypad assembly along the line 2—2 as shown in FIG. 1.

FIG. 6b is a cross-sectional view of the drive nut along the line 6b—6b as shown in FIG. 6a.

DETAILED DESCRIPTION OF THE PREFERRED EMBODIMENTS

As shown in the drawings for purposes of illustration, the invention is embodied in a keypad assembly and a lead screw assembly. In preferred embodiments of the present invention, the keypad assembly is attached to an emergency call box, and the keypad assembly utilizes the lead screw assembly to move a curved keypad plate and a curved TDD keypad from a retracted position, through a curved path, to an extended position. This allows users of various heights and in wheelchairs to utilize the TDD keypad to bidirectionally communicate with an emergency dispatch operator without the need for voice communication. However, it will be recognized that further embodiments of the invention may be included in other devices that have TDD or TTY capability or may be used in other devices that extend and retract a curved member. In alternative embodiments, the keypad assembly may be deployed from other devices, such as telephones, computers, kiosks, karaoke machines, or the like. In further alternative embodiments, the lead screw assembly may be used in other devices, such as a display case, to extend and retract other curved members, such as a frame of the display case. In additional embodiments, the keypad assembly may include other input devices that are curved, such as a standard keyboard, an I/O keypad, a track ball, a touch screen, or the like.

Figure 1:
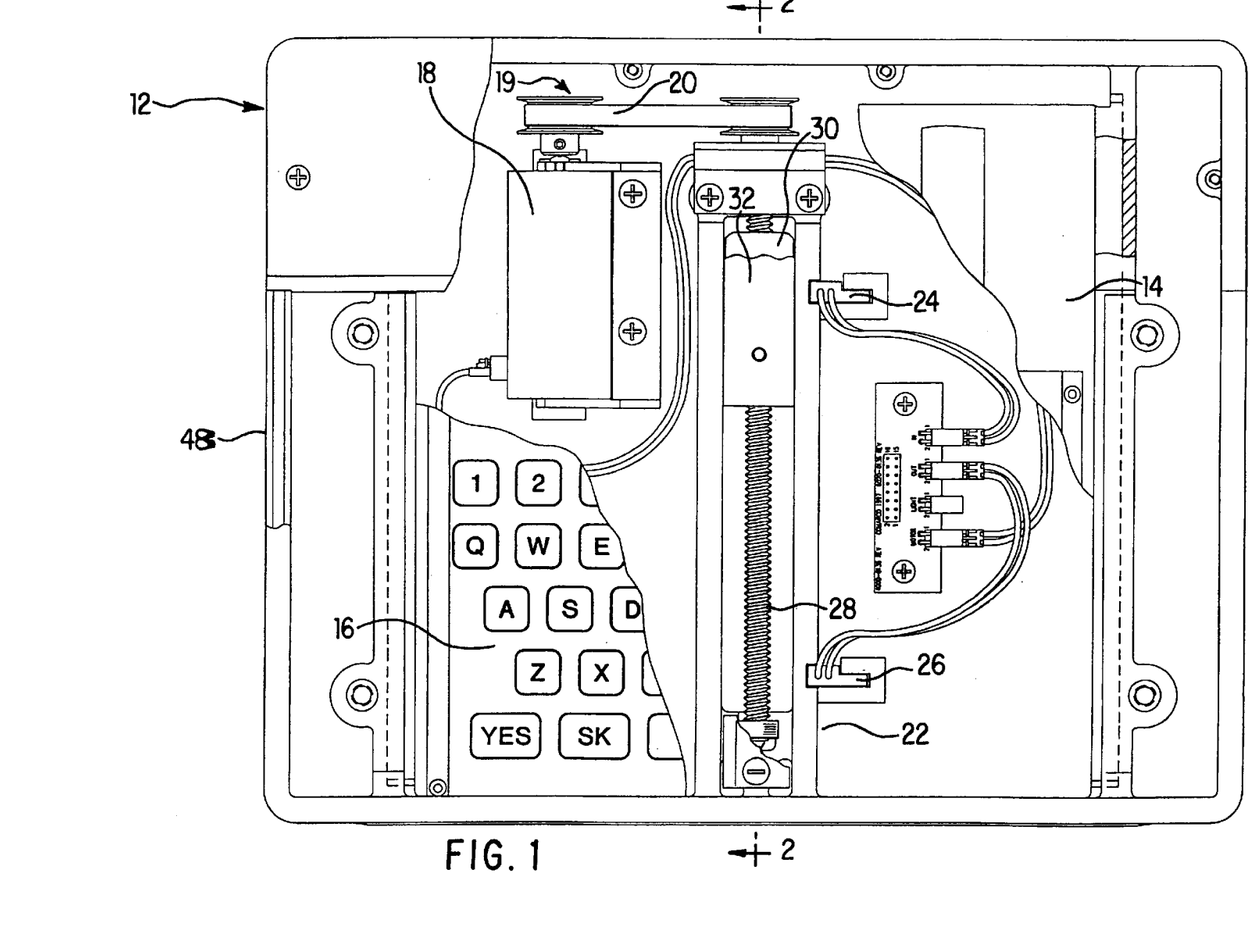
FIG. 1 is a top plan and partial cut-away view of a keypad assembly, with a keypad plate and a keypad in a retracted position, in accordance with an embodiment of the present invention.
Figure 2A:
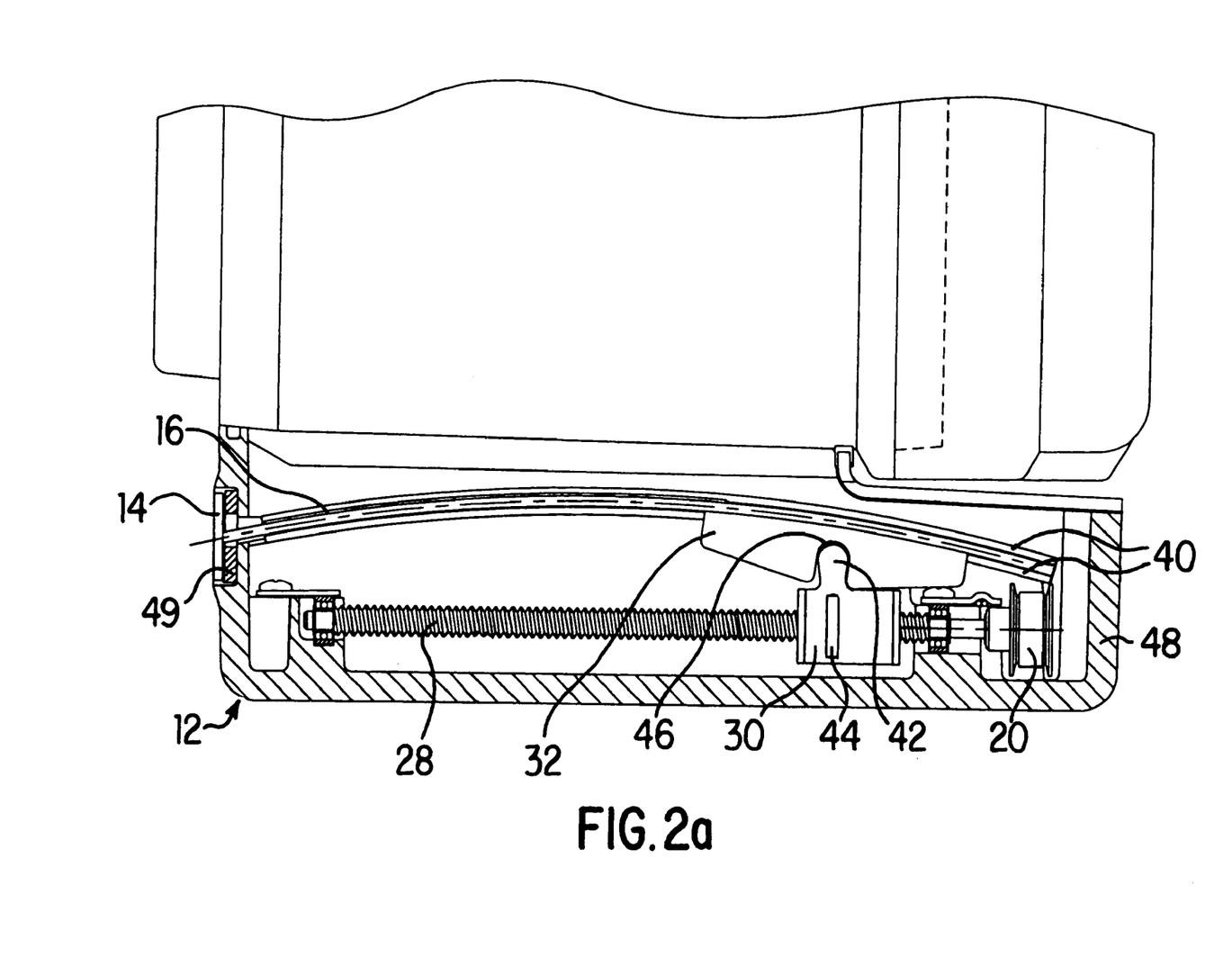
FIG. 2a is a view of the keypad assembly with the keypad plate and the keypad in a retracted position.

FIGS. 1 and 2a illustrate a top plan and partial cut-away view of a keypad assembly 12, with a keypad plate 14 and a keypad 16 in a retracted position, in accordance with an embodiment of the present invention. In the illustrated embodiment, a keypad assembly 12 is formed from a housing 48 containing a curved keypad plate 14, a curved keypad 16, a movement mechanism 10, a lead screw assembly 22, and two position sensors 24 and 26. In one embodiment, the movement mechanism 10 includes an electric motor 18 and a pulley 20. However, in alternative embodiments, the movement mechanism may include other parts, such as a gear, a spring, or the like. In one embodiment, the motor 18 is a rotating DC motor. However, in alternative embodiments, the motor 18 may be a stepping motor or the like.

The lead screw assembly 22 includes a linear lead screw 28, an articulating drive nut 30, and a slider 32. The lead screw 28 has a longitudinal axis and threads. In one embodiment, the lead screw 28 is made of stainless steel that is passivated and then finished with teflon coating. However, in alternative embodiments, the lead screw 28 may be made of other suitable materials, such as plastic, ceramic, metal, composites, or the like. In further alternative embodiments, the lead screw 28 may be formed out of other configurations, using a belt, a chain, a spring, or the like, to move the drive nut 30. However, the lead screw 28 is preferred because the lead screw 28 more effectively resists the keypad plate 14 and the keypad 16 being pulled out to an extended position when not being driven, and thus tends to protect the keypad plate 14 and the keypad 16 from vandalism.

Figure 8A:
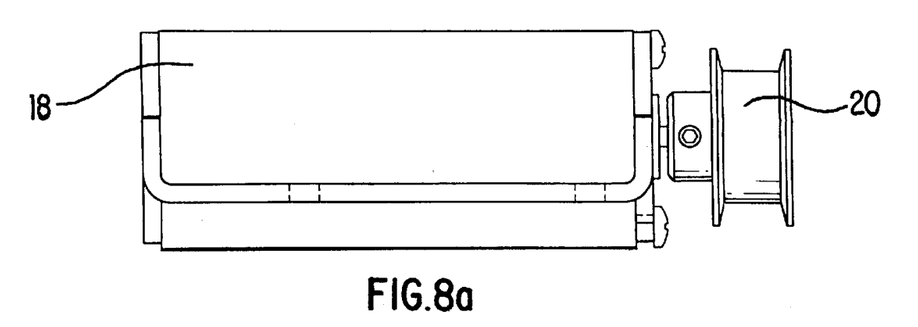
FIG. 8a is a side plan view of a motor coupled to a pulley in accordance with an embodiment of the present invention.
Figure 8B:
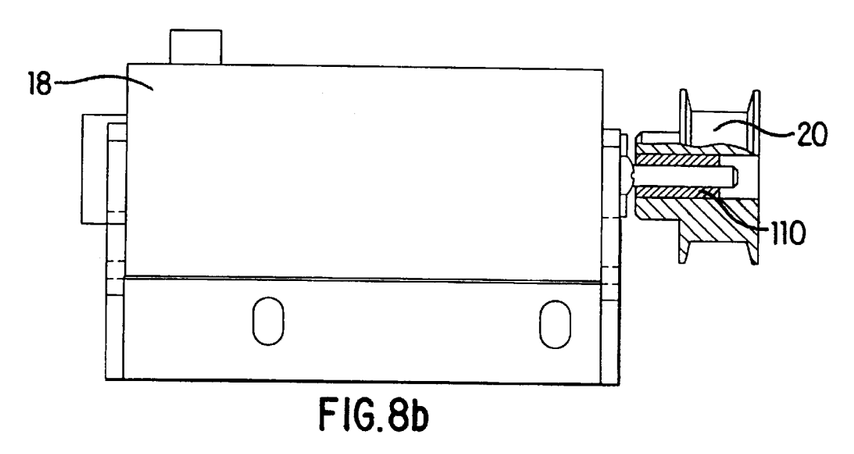
FIG. 8b is a top plan and partial cross-sectional view of the motor coupled to the pulley.
Figure 8C:
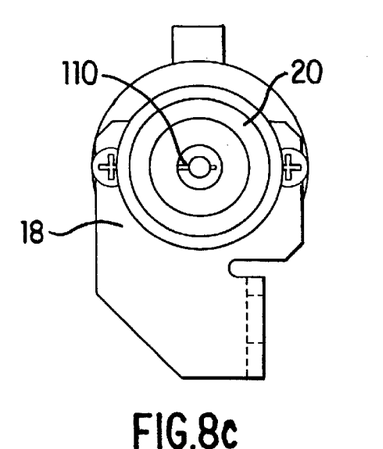
FIG. 8c is an end plan view of the motor coupled to the pulley.
Figure 9A:
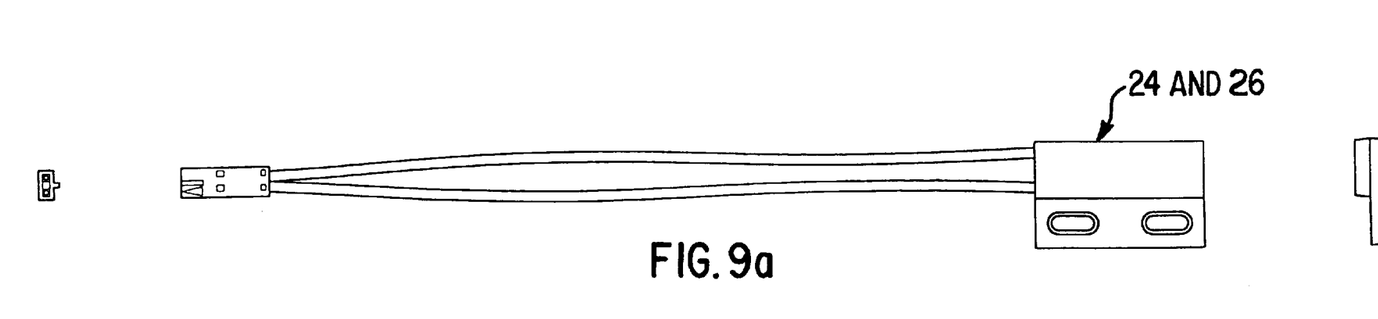
FIG. 9a is a top plan view of a position sensor in accordance with an embodiment of the present invention.
Figure 9B:
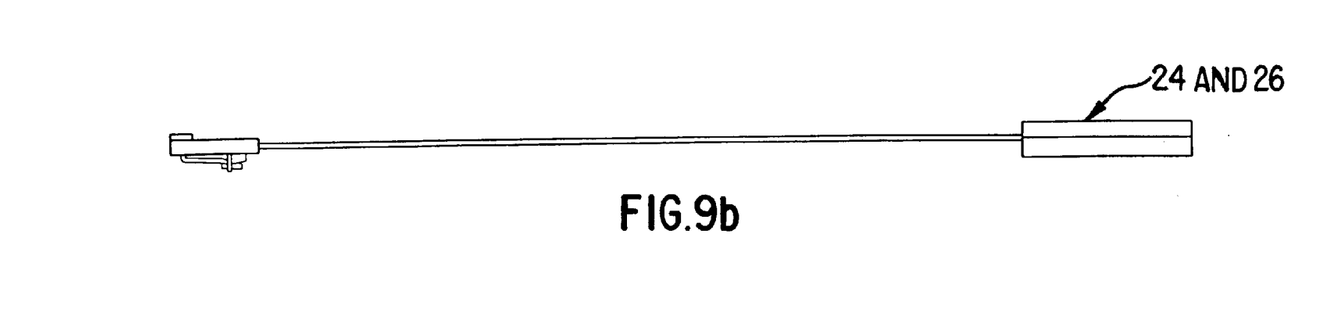
FIG. 9b is a side plan view of the position sensor.

In the embodiment illustrated in FIG. 1, the pulley 20 is coupled to the motor 18 to provide rotary motion. Referring to FIGS. 8a and 8b, the motor 18 has a bore spacer 110 that is inserted into the pulley 20 to secure the motor 18 to the pulley 20. In the embodiment illustrated in FIG. 1, the pulley 20 is also coupled to the lead screw 28 to rotate the lead screw 28 about the longitudinal axis of the lead screw 28. In alternative embodiments, the pulley 20 may be a gear, or the like, that is coupled to corresponding gears, or the like, on the motor 18 and the lead screw 28.

Referring to FIGS. 2a–2c, 6a, and 6b, the drive nut 30 contains a magnet 44 that is pressed flush into a slot in the drive nut 30. Referring to FIG. 1, the position sensors 24 and 26 are reed switches that are activated by the magnet 44 in the drive nut 30. The position sensors 24 and 26 are coupled to the housing 48 for determining when the keypad plate 14 and the keypad 16 are in a retracted position and an extended position.

Figure 2B:
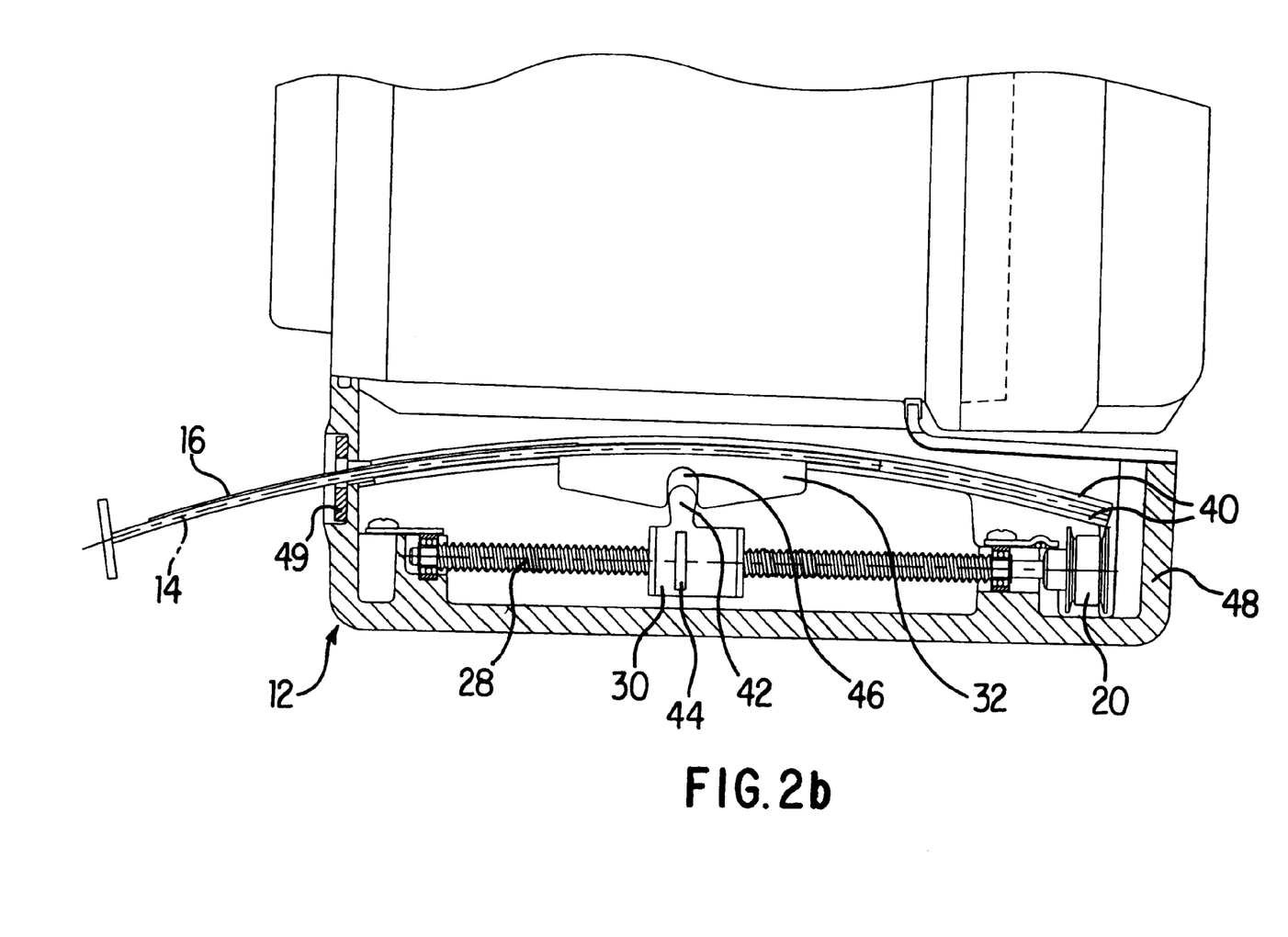
FIG. 2b is a view of the keypad assembly with the keypad plate and the keypad at an apex of a curved path of movement between the retracted position and an extended position.
Figure 2C:
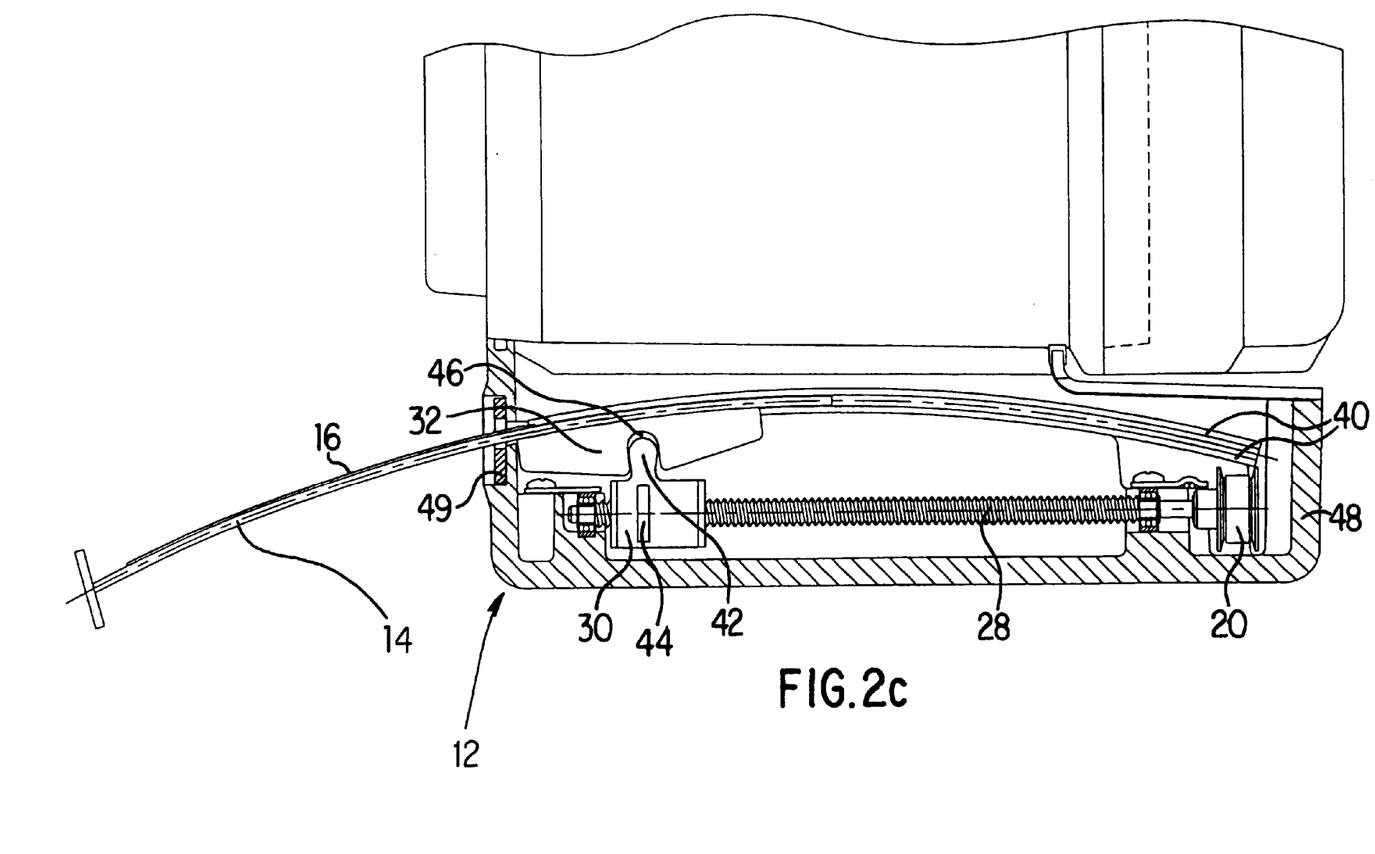
FIG. 2c is a view of the keypad assembly with the keypad plate and the keypad in the extended position.

FIGS. 2a–2c show partial cross-sectional views of the keypad assembly 12 along the line 2—2 as shown in FIG. 1. In preferred embodiments, the housing 48 has a curved path between the retracted position and the extended position. The keypad plate 14 is engaged in a set of tracks 40 and glides along the set of tracks 40 as it moves between the retracted position and the extended position. The drive nut 30 has a connecting structure and a bore with threads that mate with the corresponding threads of the lead screw 28 to move the drive nut 30 linearly along the longitudinal axis of the lead screw 28 when the lead screw 28 rotates. The slider 32 is attached underneath the keypad plate 14 using fasteners, such as screws, bolts, nails, rivets, or the like. The slider 32 also has a connecting structure that operatively couples with the connecting structure of the drive nut 30 to permit lateral and rotational movement of the slider 32 perpendicular to the longitudinal axis of the lead screw 28 such that the keypad plate 14 and the keypad 16 are moved through the curved path between the retracted position and the extended position as the drive nut 30 moves linearly along the longitudinal axis of the lead screw 28 and the keypad plate 14 glides along the set of tracks 40.

Referring to FIGS. 2a–2c and 5–6b, the connecting structure of the drive nut 30 is a protruding knob 42. Referring to FIGS. 2a–2c, 7a, and 7b, the connecting structure of the slider 32 is a receiving recess 46. Referring to FIGS. 2a–2c, the receiving recess 46 of the slider 32 loosely couples with the protruding knob 42 of the drive nut 30 to permit lateral and rotational movement of the slider 32 perpendicular to the longitudinal axis of the lead screw 28 such that the keypad plate 14 and the keypad 16 are moved through the curved path between the retracted position and the extended position as the drive nut 30 moves linearly along the longitudinal axis of the lead screw 28 and the keypad plate 14 glides along the set of tracks 40.

The protruding knob 42 of the drive nut 30 and the receiving recess 46 of the slider 32 shown in FIGS. 2a–2c are preferred because the knob 42 and the recess 46 have smooth, rounded surfaces that are unlikely to "catch" and hinder movement of the keypad plate 14 and the keypad 16 between the retracted position and the extended position. However, in alternative embodiments, the drive nut 30 may have other protruding structures, such as a triangular pivot, a rectangular post, or the like, and the slider 32 may have other receiving structures that correspond with the protruding structure of the drive nut 30, such as a triangular trough, a rectangular slot, or the like. In further alternative embodiments, the connecting structures of the drive nut 30 and the slider 32 may be switched, so that the drive nut 30 has the receiving recess or other receiving structure, and the slider 32 has the protruding knob or other protruding structure.

In the illustrated embodiment, when the keypad plate 14 and the keypad 16 are in the retracted position, the distance between the top of the protruding knob 42 of the drive nut 30 and the bottom of the receiving recess 46 of the slider 32 is at a minimum value, as illustrated in FIG. 2a. As the drive nut 30 moves linearly along the longitudinal axis of the lead screw 28 and the keypad plate 14 glides along the set of tracks 40, the receiving recess 46 of the slider 32 rotates about the protruding knob 42 of the drive nut 30. In addition, the distance between the top of the protruding knob 42 of the drive nut 30 and the bottom of the receiving recess 46 of the slider 32 increases, reaching a maximum value when the keypad plate 14 and the keypad 16 are at the apex of their curved path of movement, as illustrated in FIG. 2b. The distance between the top of the protruding knob 42 of the drive nut 30 and the bottom of the receiving recess 46 of the slider 32 then decreases again as the drive nut 30 continues to move linearly along the longitudinal axis of the lead screw 28, reaching another minimum value when the keypad plate 14 and the keypad 16 are in the extended position, as illustrated in FIG. 2c. Also, the keypad plate 14 continues to glide along the set of tracks 40 and the receiving recess 46 of the slider 32 continues to rotate about the protruding knob 42 of the drive nut 30.

Figure 3:
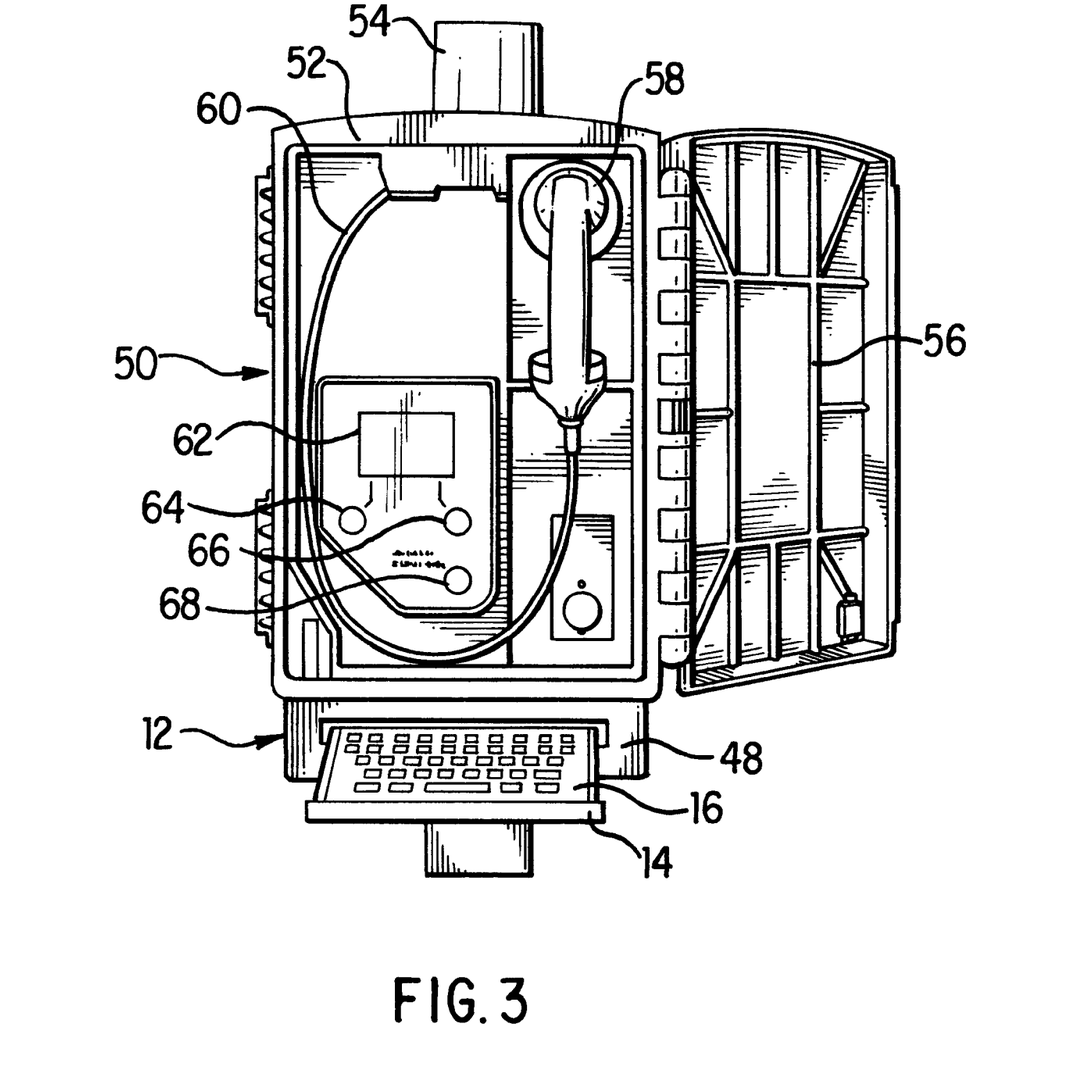
FIG. 3 is a perspective view of the keypad assembly attached to an emergency call box, with the keypad plate and the keypad in the extended position, in accordance with an embodiment of the present invention.

FIG. 3 shows a perspective view of the keypad assembly 12 attached to an emergency call box 50, with the keypad plate 14 and the keypad 16 in the extended position, in accordance with an embodiment of the present invention. An emergency call box 50 is formed from a housing 52 that is attached to a road standard 54 with fasteners, such as screws, bolts, nails, rivets, or the like. The housing 52 includes a door 56 that opens to expose a standard telephone handset 58 attached to an armored cable 60, a display 62, and push button selection switches 64, 66, and 68. The housing 52 also includes current sense circuitry (not shown) that controls the motor 18. The keypad assembly 12 is attached underneath the housing 52 with fasteners, such as screws, bolts, nails, rivets, or the like. A detailed example of an emergency call box and a method of controlling the emergency call box in TDD mode are disclosed in pending U.S. patent application Ser. No. 08/743,952, filed Oct. 30, 1996, which is incorporated herein by reference.

Figure 4:
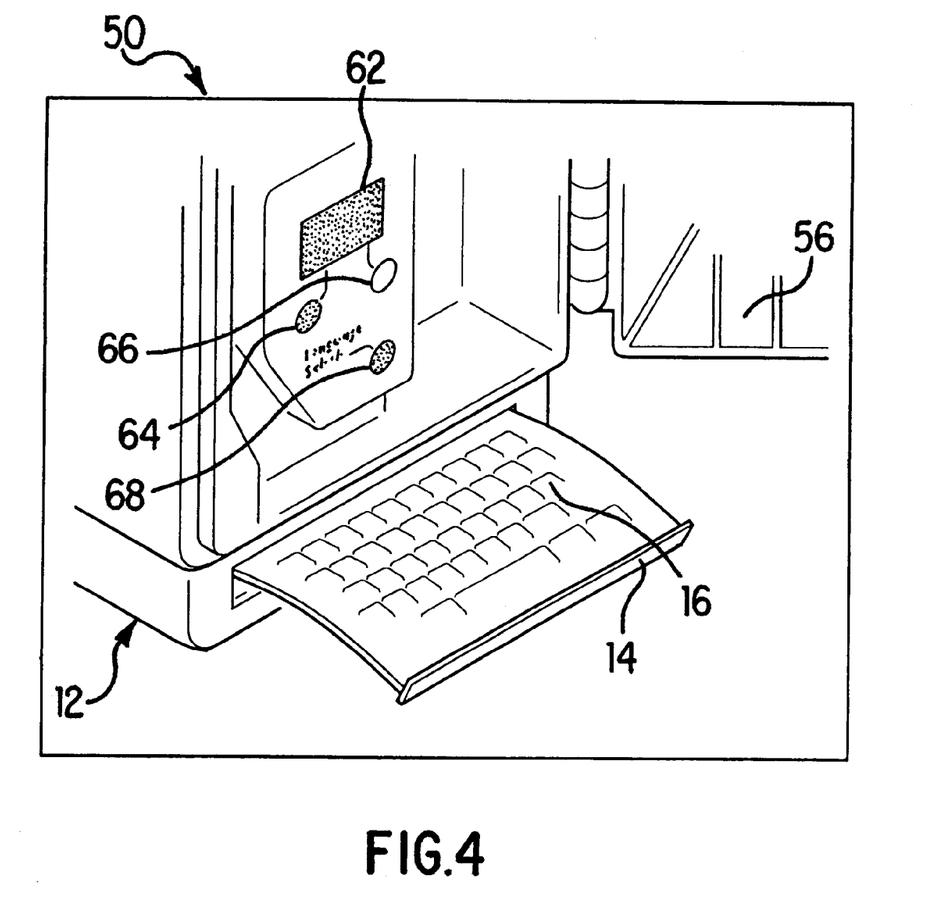
FIG. 4 is a partial perspective view of the keypad assembly attached to the emergency call box, with the keypad plate and the keypad in the extended position, in accordance with an embodiment of the present invention.
Figure 5:
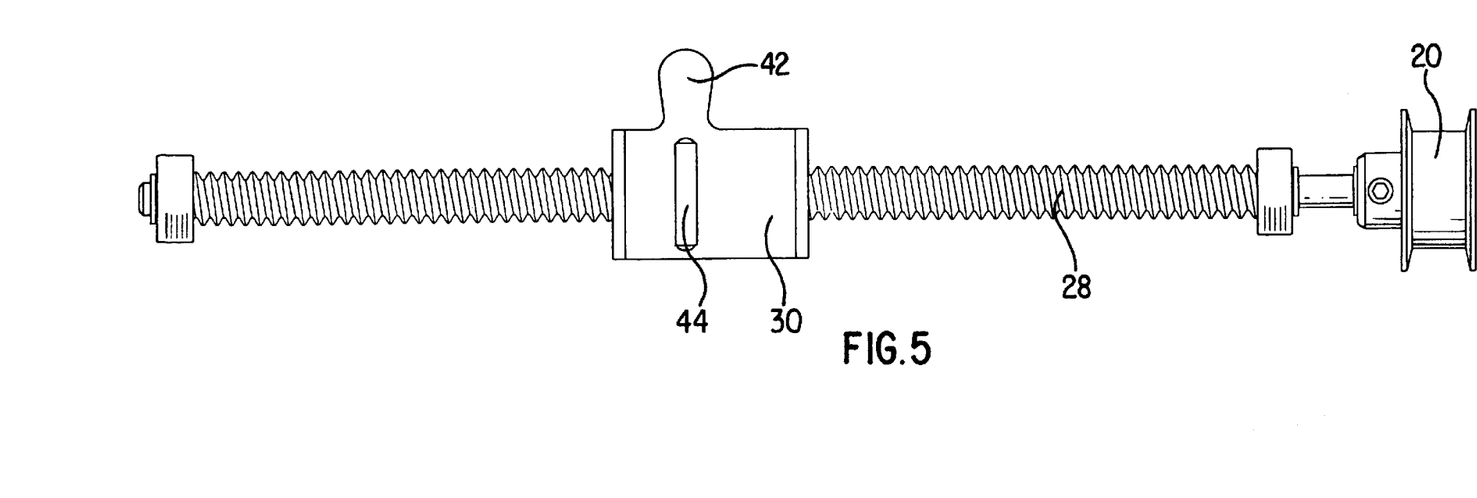
FIG. 5 is a side plan view of a lead screw assembly in accordance with an embodiment of the present invention.
Figure 6A:
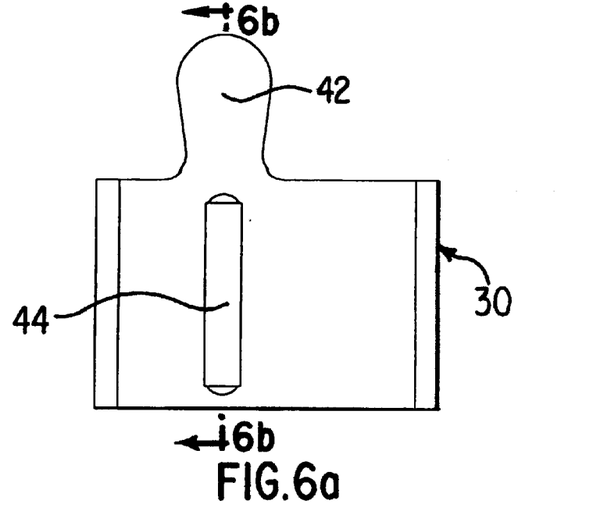
FIG. 6a is a side plan view of a drive nut in accordance with an embodiment of the present invention.
Figure 6B:
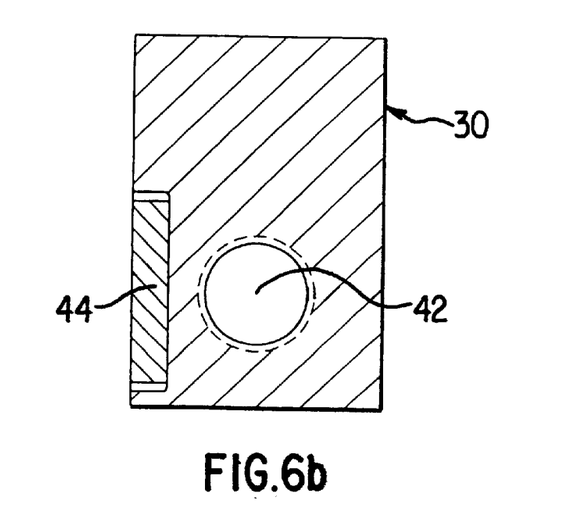

FIG. 4 illustrates a partial perspective view of the keypad assembly 12 attached to the emergency call box 50, with the keypad plate 14 and the keypad 16 in the extended position, in accordance with an embodiment of the present invention. More specifically, FIG. 4 shows the curvature of the keypad plate 14 and the keypad 16. Referring to FIGS. 1–4, when a user opens the door 56 of the emergency call box 50 to place an emergency call to an emergency dispatch operator, the user is prompted for a Yes/No response to the choice of "TTY" or "Phone." If the user selects "TTY," the user is prompted with a series of questions. The motor 18 then automatically turns on, and the keypad plate 14 and the keypad 16 are moved from the retracted position to the extended position. In alternative embodiments, the motor 18 may be turned on by other actions, such as opening the door 56 of the emergency call box 50 or pushing an activation button on the emergency call box 50.

When the magnet 44 in the drive nut 30 is in the proximity of the position sensor 26, the magnet 44 activates the position sensor 26, and the position sensor 26 signals the current sense circuitry in the emergency call box housing 52 to drop voltage to the motor 18. Dropping the voltage to the motor 18 slows down the rotation of the lead screw 28, thus preventing the lead screw 28 and the drive nut 30 from locking up and jamming. When the keypad plate 14 and the keypad 16 are in the extended position, the slider 32 stops against the housing 48 of the keypad assembly 12, as shown in FIG. 2c. This drives up current on the circuitry in the emergency call box housing 52, and the circuitry then shuts off a relay to the motor 18, thus shutting down the motor 18. If the keypad plate 14 and the keypad 16 are unable to move completely out to the extended position, the magnet 44 in the drive nut 30 does not activate the position sensor 26. This drives up current on the circuitry in the emergency call box housing 52, and the motor 18 then reverses, thus returning the keypad plate 14 and the keypad 16 to the retracted position.

In preferred embodiments, when the keypad plate 14 and the keypad 16 are in the extended position, the keypad plate 14 and the keypad 16 are curved at a downward angle to an ergonomic height to accommodate use by persons of various heights and in wheelchairs, as illustrated in FIGS. 2c and 4. The ergonomics of the height and the angle of the keypad plate 14 and the keypad 16 comply with the guidelines defined in the book "Human Scale 1/2/3." In preferred embodiments, the keypad plate 14 and the keypad 16 are positioned at a height of about 36 inches (about 91 centimeters) from ground level and curve at a downward angle of about 20 degrees. However, in alternative embodiments, the keypad plate 14 and the keypad 16 may be positioned at other heights and angles that provide an ergonomic position.

Referring to FIGS. 1–4, when the emergency dispatch operator or the user ends the emergency call, the motor 18 turns on, and the keypad plate 14 and the keypad 16 are moved from the extended position back to the retracted position. In alternative embodiments, the motor 18 may be turned on by other actions, such as closing the door 56 of the emergency call box 50 or pushing an activation button on the emergency call box 50.

When the magnet 44 in the drive nut 30 is in the proximity of the position sensor 24, the magnet 44 activates the position sensor 24, and the position sensor 24 signals the current sense circuitry in the emergency call box housing 52 to drop voltage to the motor 18. Dropping the voltage to the motor 18 slows down the rotation of the lead screw 28, thus preventing the lead screw 28 and the drive nut 30 from locking up and jamming. Dropping the voltage to the motor 18 also reduces the force with which the keypad plate 14 and the keypad 16 return to the retracted position, thus protecting against pinching the user's fingers, other body parts, or clothing. When the keypad plate 14 and the keypad 16 are in the retracted position, the front of the keypad plate 14 stops against a gasket 49, as shown in FIG. 2a. This drives up current on the circuitry in the emergency call box housing 52, and the circuitry then shuts off the relay to the motor 18, thus shutting down the motor 18. If the keypad plate 14 and the keypad 16 are unable to move completely back to the retracted position, the magnet 44 in the drive nut 30 does not activate the position sensor 24. This drives up current on the circuitry in the emergency call box housing 52, and the motor 18 then reverses, thus returning the keypad plate 14 and the keypad 16 to the extended position.

Figure 10A:
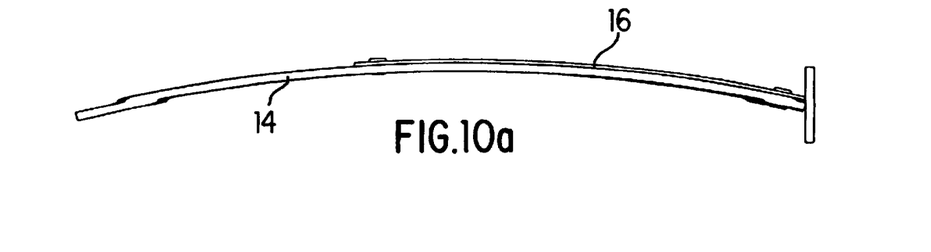
FIG. 10a is a side plan view of the keypad mounted on top of the keypad plate in accordance with an embodiment of the present invention.
Figure 10B:
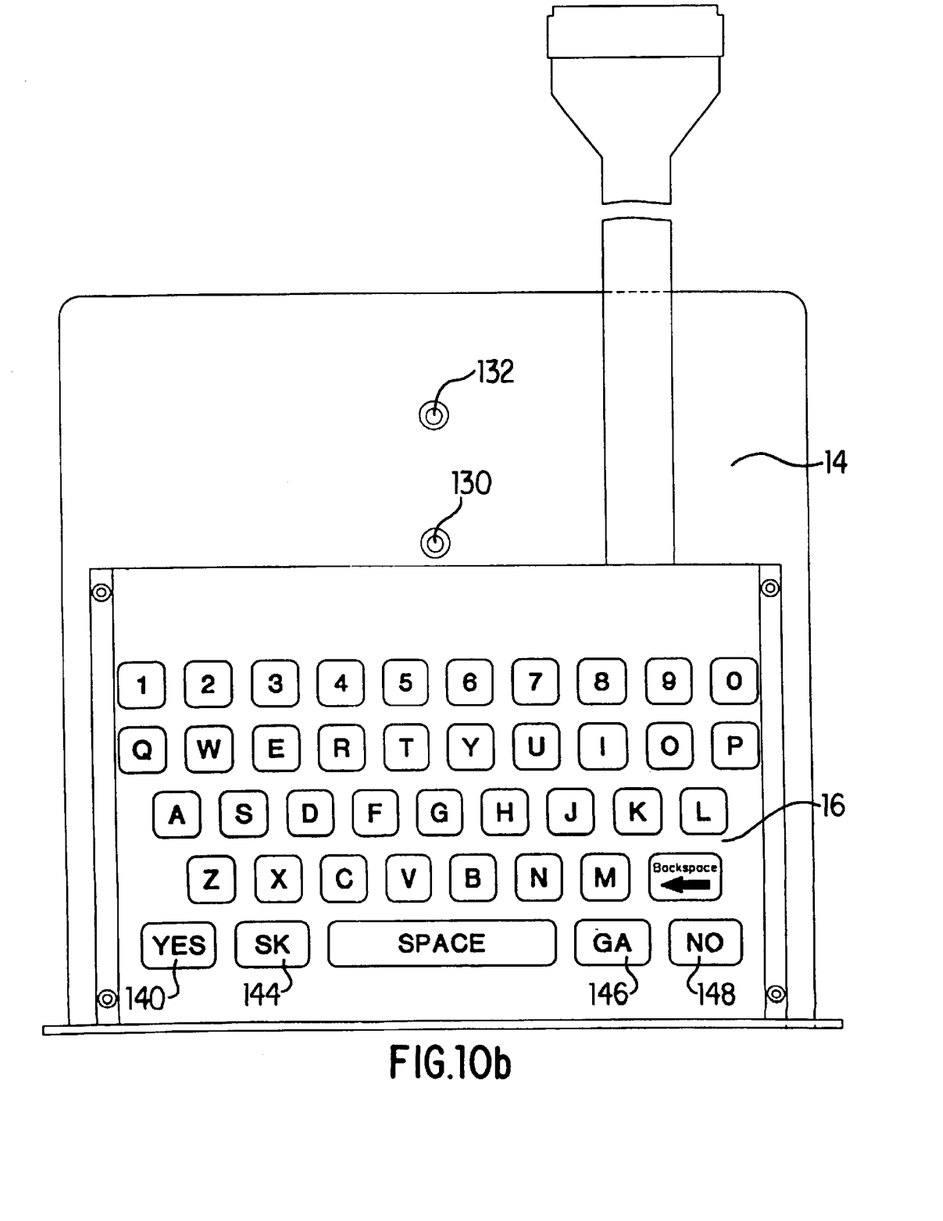
FIG. 10b is a top plan view of the keypad mounted on top of the keypad plate.

FIGS. 10a and 10b illustrate detailed views of the keypad 16 mounted on top of the keypad plate 14 in accordance with an embodiment of the present invention. In one embodiment, the keypad plate 14 is made of cold rolled steel that is zincchromate plated and then painted. However, in alternative embodiments, the keypad plate 14 may be made of other suitable materials, such as plastic, ceramic, metal, composites, or the like. The keypad 16 is a membrane with tactile feedback, which utilizes membrane switch technology that is overlaid with textured polyester and then hard coated to provide a hermetic seal that is substantially impervious to harsh environments. In one embodiment, the keypad 16 is mounted on top of the keypad plate 14 using adhesive. However, in alternative embodiments, the keypad 16 may be mounted on top of the keypad plate 14 using fasteners, such as screws, bolts, nails, rivets, or the like.

Figure 7A:
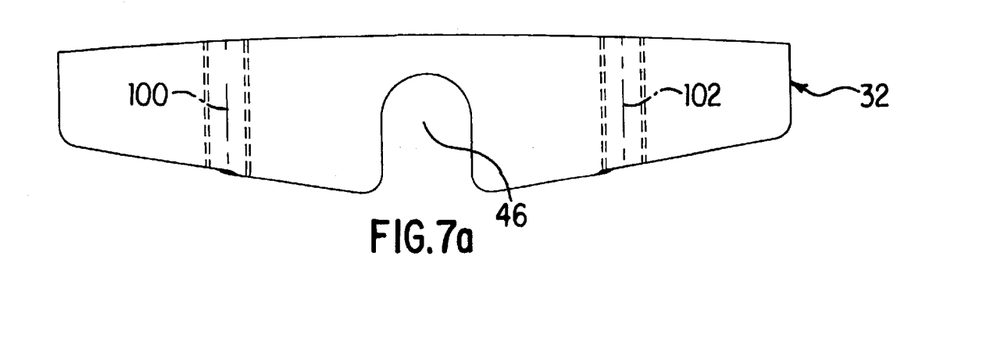
FIG. 7a is a side plan view of a slider in accordance with an embodiment of the present invention.
Figure 7B:
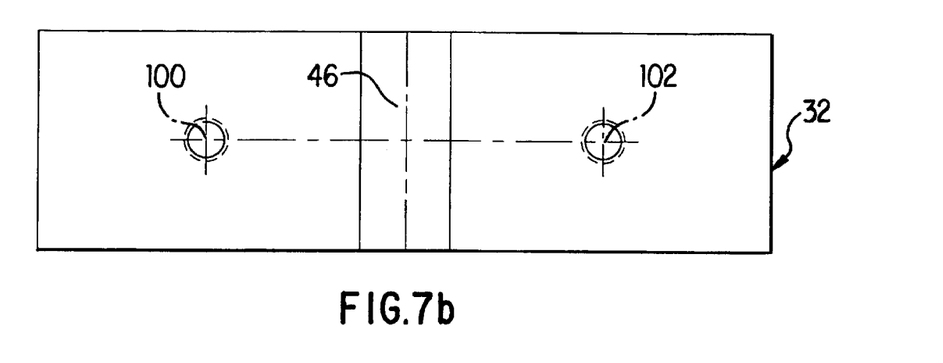
FIG. 7b is a bottom plan view of the slider.
Figure 7C:
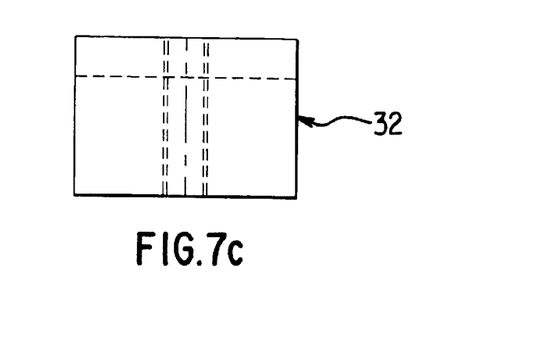
FIG. 7c is an end plan view of the slider.

Referring to FIG. 10b, the keypad plate 14 has two holes with threads 130 and 132. As illustrated in FIGS. 7a and 7b, the slider 32 also has two corresponding holes with threads 100 and 102, one hole on each side of the receiving recess 46. Referring to FIGS. 2a–2c, the holes 100 and 102 in the slider 32 are aligned with the holes 130 and 132 in the keypad plate 14. In one embodiment, screws are inserted through the holes 100 and 102 in the slider 32 and the holes 130 and 132 in the keypad plate 14 to secure the slider 32 underneath the keypad plate 14. In alternative embodiments, the slider 32 may be secured underneath the keypad plate 14 using other types of fasteners, such as bolts, nails, rivets, or the like.

Figure 11:
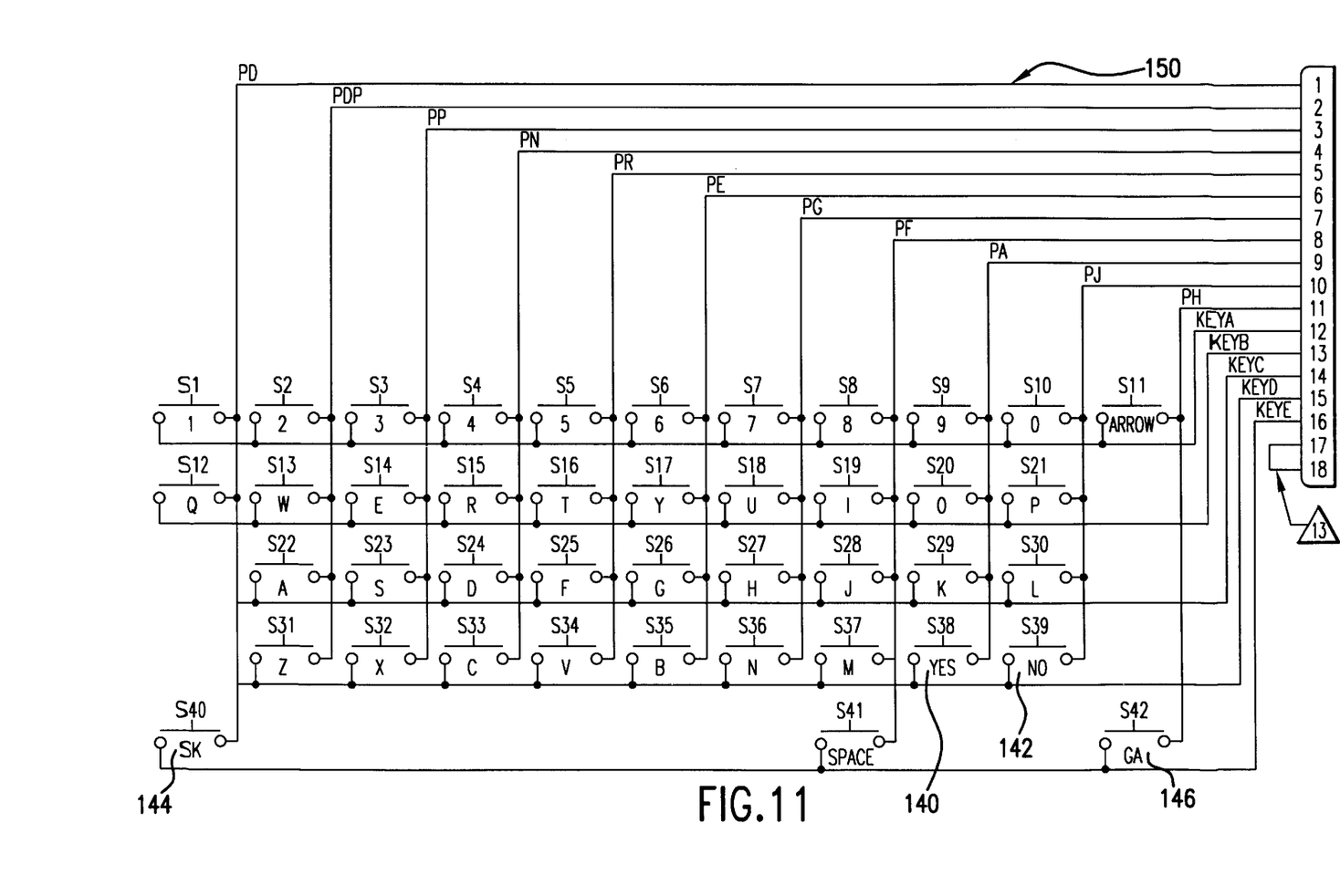
FIG. 11 is a schematic diagram of a keypad circuit in accordance with an embodiment of the present invention.

FIG. 11 shows a schematic diagram of a keypad circuit 150 in accordance with an embodiment of the present invention. Referring to FIGS. 10a–11, the keypad 16 includes keys labeled as "Yes" 140 and "No" 142 to allow the user to quickly respond to questions presented on the display 62 of the emergency call box 50 illustrated in FIG. 3. The keypad 16 also includes keys labeled as "SK" 144 and "GA" 146, which are standard TDD abbreviations for "stopped keying" and "go ahead" respectively, to facilitate use of the keypad 16 for bidirectional communication between a user and an emergency dispatch operator without the need for voice communication.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An apparatus capable of moving between a retracted position and an extended position, the apparatus comprising:
   a curved member having a rounded exterior surface;
   a linear lead screw having a longitudinal axis and threads;
   a first carriage having a connecting structure and a bore with threads that mate with the threads of the lead screw to move the carriage linearly along the longitudinal axis of the lead screw when the lead screw rotates; and
   a second carriage coupled to the curved member at a surface opposite the rounded exterior surface and having a connecting structure, wherein the connecting structure of the second carriage operatively couples with the connecting structure of the first carriage to permit lateral and rotational displacement such that the curved member is moved through a curved path as the first carriage moves linearly along the longitudinal axis of the lead screw.

2. The apparatus of claim 1, further comprising:
   a set of tracks engaging the member, wherein the curved member glides along the set of tracks as the curved member is moved between the retracted position and the extended position.

3. The apparatus of claim 1, further comprising:
   a plurality of position sensors coupled to the apparatus for determining when the curved member is in the retracted position and when the curved member is in the extended position.

4. The apparatus of claim 1, wherein the first carriage is an articulating drive nut with a protruding knob and the second carriage is a slider with a receiving recess, wherein the receiving recess of the slider loosely couples with the protruding knob of the drive nut to permit lateral and rotational displacement such that the curved member is moved through the curved path as the drive nut moves linearly along the longitudinal axis of the lead screw.

5. The apparatus of claim 1, wherein the curved member further comprises:
   a curved keypad that is a membrane-type; and
   a curved keypad plate that is coupled to the curved keypad;
   wherein the curved keypad plate and the curved keypad curve downward to an ergonomic position when the curved keypad plate and the curved keypad are in the extended position.

6. An apparatus capable of moving between a retracted position and an extended position, the apparatus comprising:
   a housing having a curved path between the retracted position and the extended position;
   a curved member disposed within the housing;
   a movement mechanism;
   a linear lead screw having a longitudinal axis and threads, wherein the movement mechanism is coupled to the lead screw to rotate the lead screw about the longitudinal axis;
   a first carriage having a connecting structure and a bore with threads that mate with the threads of the lead screw to move the carriage linearly along the longitudinal axis of the lead screw when the lead screw rotates; and
   a second carriage coupled to the curved member and having a connecting structure, wherein the connecting structure of the second carriage operatively couples with the connecting structure of the first carriage to permit lateral and rotational displacement such that the curved member is moved through the curved path between the retracted position and the extended position as the first carriage moves linearly along the longitudinal axis of the lead screw.

7. The apparatus of claim 6, further comprising:
   a set of tracks engaging the curved member, wherein the curved member glides along the set of tracks as the curved member is moved between the retracted position and the extended position.

8. The apparatus of claim 6, further comprising:
a plurality of position sensors coupled to the housing for determining when the curved member is in the retracted position and when the curved member is in the extended position.

9. The apparatus of claim 6, wherein the first carriage is an articulating drive nut with a protruding knob and the second carriage is a slider with a receiving recess, wherein the receiving recess of the slider loosely couples with the protruding knob of the drive nut to permit lateral and rotational displacement such that the curved member is moved through the curved path as the drive nut moves linearly along the longitudinal axis of the lead screw.

10. The apparatus of claim 6, wherein the curved member further comprises:
a curved keypad that is a membrane-type; and
a curved keypad plate that is coupled to the curved keypad;
wherein the curved keypad plate and the curved keypad curve downward to an ergonomic position when the curved keypad plate and the curved keypad are in the extended position.

11. The apparatus of claim 10, wherein the apparatus is attached to an emergency call box and the keypad is a TDD keypad that enables bidirectional communication between a user and an emergency dispatch operator without the need for voice communication.

12. The apparatus of claim 6, wherein the movement mechanism further comprises:
a motor; and
a pulley coupled to the motor to provide rotary motion.

13. The apparatus of claim 12, further comprising:
a plurality of position sensors coupled to the housing for determining when the curved member is in the retracted position and when the curved member is in the extended position, wherein the motor is shut down when the position sensors determine that the curved member has moved from the retracted position to the extended position and from the extended position back to the retracted position.

* * * * *